(12) United States Patent
Sayers

(10) Patent No.: US 6,898,334 B2
(45) Date of Patent: May 24, 2005

(54) SYSTEM AND METHOD FOR USING PRINTED DOCUMENTS

(75) Inventor: Craig P. Sayers, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 653 days.

(21) Appl. No.: 10/046,831

(22) Filed: Jan. 17, 2002

(65) Prior Publication Data

US 2003/0133629 A1 Jul. 17, 2003

(51) Int. Cl.[7] ................................................ G06K 9/22
(52) U.S. Cl. ...................... 382/313; 382/312; 382/314; 382/321
(58) Field of Search ................................ 382/312, 313, 382/314, 321, 188, 187, 232; 235/494, 487; 345/179, 178; 358/3.28, 462, 1.15, 454

(56) References Cited

U.S. PATENT DOCUMENTS

| | | | | |
|---|---|---|---|---|
| 4,431,322 | A | * | 2/1984 | Nally et al. .................. 400/605 |
| 6,768,821 | B2 | * | 7/2004 | Silverbrook et al. ........ 382/313 |
| 6,792,165 | B1 | * | 9/2004 | Silverbrook et al. ........ 382/314 |
| 6,795,593 | B2 | * | 9/2004 | Silverbrook et al. ........ 382/313 |
| 6,823,075 | B2 | * | 11/2004 | Perry .......................... 382/100 |

FOREIGN PATENT DOCUMENTS

JP          362272746         * 11/1987     ............ H04N/1/04

OTHER PUBLICATIONS

Anoto, "Uniting Handwriting With The Digital World", www.anoto.com, downloaded Oct. 29, 2001.
Silberman, Steve, "The Hot New Medium: Paper", www.wired.com/wired/archive/9.04/anoto.html, downloaded Oct. 29, 2001.

* cited by examiner

Primary Examiner—Anh Hong Do

(57) ABSTRACT

A system and method for using specially printed paper and a handheld device to supplement, or replace, large displays and user interfaces commonly required for efficient use of computing devices. The paper is encoded with location information and a message. The message is distributed redundantly across the page, may be arbitrarily large, and may contain security information. In one embodiment, the device uses a single sensor to read the encoded message and location information, and to measure the relative motion of the device. After scanning the specially printed paper, a user may then raise the device, place it on any convenient flat surface, and continue to slide, exploring areas outside of the printed copy.

38 Claims, 7 Drawing Sheets

SYSTEM AND METHOD FOR USING PRINTED DOCUMENTS

BACKGROUND

The design of displays for computing devices is always a compromise. If the display is large, then the device is too expensive, and too large, to be practical. If the display is small, then too little information can be displayed at once. Thus, when viewing large documents, users can only view a small portion at any one time, and must often manipulate controls to adjust the visible portion—looking first at one part, then at another. This works, but is inefficient.

Printed documents are easier to read than most computer displays. They can be much larger and have higher resolution than computer displays. They can also be navigated quickly—for example, a salesperson familiar with the company catalogue can very quickly locate the page where an item of interest is described. However, printed documents have the disadvantage that they are static, and often out-of-date.

One way of interacting with a printed paper is described by Anoto AB, a subsidiary of C Technologies AB of Sweden. They print special paper forms, which have a specific address printed in each 2 mm×2 mm square section. The Anoto™ system uses a pen with a built-in camera that recognizes the printed pattern. If a user writes on the paper with this pen, the pen reads the addressing information, and sends the addresses to a server. The server forwards the pen's recorded motion to the entity that has leased/purchased the identified portion of the fixed address space. For example, suppose Filofax Group Limited purchases a section of the address space for e-mail purposes. A user could then buy e-mail paper from Filofax®. When the user writes on the e-mail paper and checks the "send" box, the pen sends its recorded movements (a list of the addresses on the page over which it passed) to the Anoto™ server. The server looks up the addresses, sees that they were leased to Filofax, and forwards the recorded movements to that company's server. The Filofax server then translates the pen's motion into an electronic message, e.g., e-mail, and then e-mails it to the user.

A disadvantage of the Anoto™ system is that the encoded address is of a fixed size. Each location on one of their printed pages corresponds to an absolute location in a 60 million $km^2$ grid. This works well for printed forms (where a small section of the address can be repeatedly used on thousands of identically-printed documents), but it doesn't allow for user-printed documents. Further, the Anoto™ system patterns must be printed on a high resolution printer at approximately 1000 dpi to fit the whole address into a 2 mm×2 mm square. Also, the system uses the combination of pen/printed paper only as an input device, and the method they employ can only provide positional information while the pen can see the paper. It does not provide a means to display up-to-date information to the user, and if you slide off the edge of the page, it stops working.

Several mechanisms are presently available for encoding an address on printed media that identifies the printed document or points to an address, i.e., Uniform Resource Identifier (URI). For example, one could print a barcode, or other identifying mark, on the document. Then one could read the barcode, recall the document, and then explore it using a pointing device (such as a mouse).

One can also use printed bar codes to serve as input devices. For example, in a store, the clerk can scan a printed bar code, rather than having to manually type an item number. It is even possible to encode large amounts of information in printed marks, and then extract it by scanning. Examples include the dataglyph developed by Xerox Corporation, and the digital watermark system developed by Digimark.

While there are numerous devices and methods for interacting with printed documents, there is a need for devices and mechanisms which allow the printed document to replace both large keyboards, and large display devices, in a very natural way.

SUMMARY

It is desired to combine the benefits of a computer display (providing immediate access to up-to-date information) with the benefits of a paper document (providing a large, high-resolution display area). It is also desirable to use printed documents to provide large amounts of relatively static information, while using computing devices to provide relatively small amounts of up-to-date information.

Furthermore, is would be desirable to use the same printed documents to supplement the input mechanisms on the computing device, so that the combination of the printed document and the small device serves as a replacement both for a large display, and a large keyboard.

An embodiment of the present invention uses specially printed paper to supplement, or replace, the large displays and user interfaces commonly required for efficient use of computing devices. An embodiment provides a method which requires only a single sensor and which supports a wide range of operations. It is shown that a combination of a small computing device, and a printed page, can be as efficient as a full sized computer with a large display and keyboard.

An embodiment of the present invention overcomes the disadvantages of the prior art by providing, on a printed page, an encoded message in a way so that multiple copies are distributed across the whole page and so that the message has an arbitrarily large size. In that way, the message may be unique to every new document that is printed and may include a full web address and/or security features. Since the message appears in multiple locations, the whole message may be obtained, even if parts of the document are missing. Both the message and the absolute location are encoded in the same way, so they can be read with a single image sensor, and with a single motion of the sensor over the paper.

Furthermore, the same sensor may be used to detect the relative motion of the device. As the sensor moves, it may use images of the surface below to detect relative motion. By comparing its measured relative motion, with the absolute position information encoded on the page, it is able to calibrate its motion sensor to the page, and may then continue to provide relative location information even when the sensor is slid past the edge of the paper. In this way, the user may navigate beyond the bounds of the real paper document.

In an exemplary embodiment, the combination of a handheld device and a specially printed page are used to plan a road trip. In this case, the printed page appears as a map to the human user, but contains both encoded location information, and a message instructing a handheld scanning device that it is a map, and how to interpret the location data. The handheld device includes a graphical display which may be transparent or opaque, and an image sensor on the underside. The image sensor is used both to read the encoded information and to detect relative motion of the device. As the user slides a PDA (personal digital assistant, or other portable device) across the map, it extracts the message, and begins to show details of the cities/sights related to the region of the printed page beneath it. To plan the trip, they move over sights of interest and press a "select" button when each is in the display. In this way, the combination of the printed page and the handheld device is used to quickly enter large amounts of information in a very natural way. When done, they slide to a region of the map on which is printed "plan my route". The PDA then plans the route, and displays it. If the user wishes, they can now view the route by sliding back over the map—on the screen they see the map below, with their route overlaid on top. In this way, the combination of the printed page and the handheld device is also serving as a replacement for a huge display. The user may then leave the printed map behind, and still manipulate the on-screen map, merely by sliding the hand-held device on any convenient flat surface.

DESCRIPTION OF DRAWINGS

An exemplary embodiment of the invention is illustrated in the drawings in which like numeral references refer to like elements, and wherein.

DETAILED DESCRIPTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

In an exemplary embodiment of the present invention, the system includes a printed page containing encoded information, a hand-held scanning device which can both read the encoded information and detect relative motion, a computing device (with access to a storage device) which can perform operations in response to the encoded information and measured motion, and display and user interface components for additional interaction with the user.

The information encoded on the printed page includes both a digital message, and absolute location information. These may be encoded by printing a set of dots on the page. In some aspects of the invention, the dots are invisible to the naked eye. One method for encoding the message and absolute location is to print the dots by moving them very slightly away from a perfect position. The amount and direction that the dot is moved away from that perfect position is the way information is encoded. An alternative way to print the dots is by printing dots and known spaces, such that a blank spot means there isn't information and a spot is put where there is information, as in a binary system.

Another method for printing dots on a page is to merely print the actual characters of the message and location in an ink which is not visible to the human eye but which is visible to the camera. Then the camera reads the characters using standard optical character recognition techniques. An ink which is visible in the near infrared might be used for this method. It will be apparent to one skilled in the art how to encode the message and location on the page using a variety of methods so that it can be made machine readable.

Figure 1:
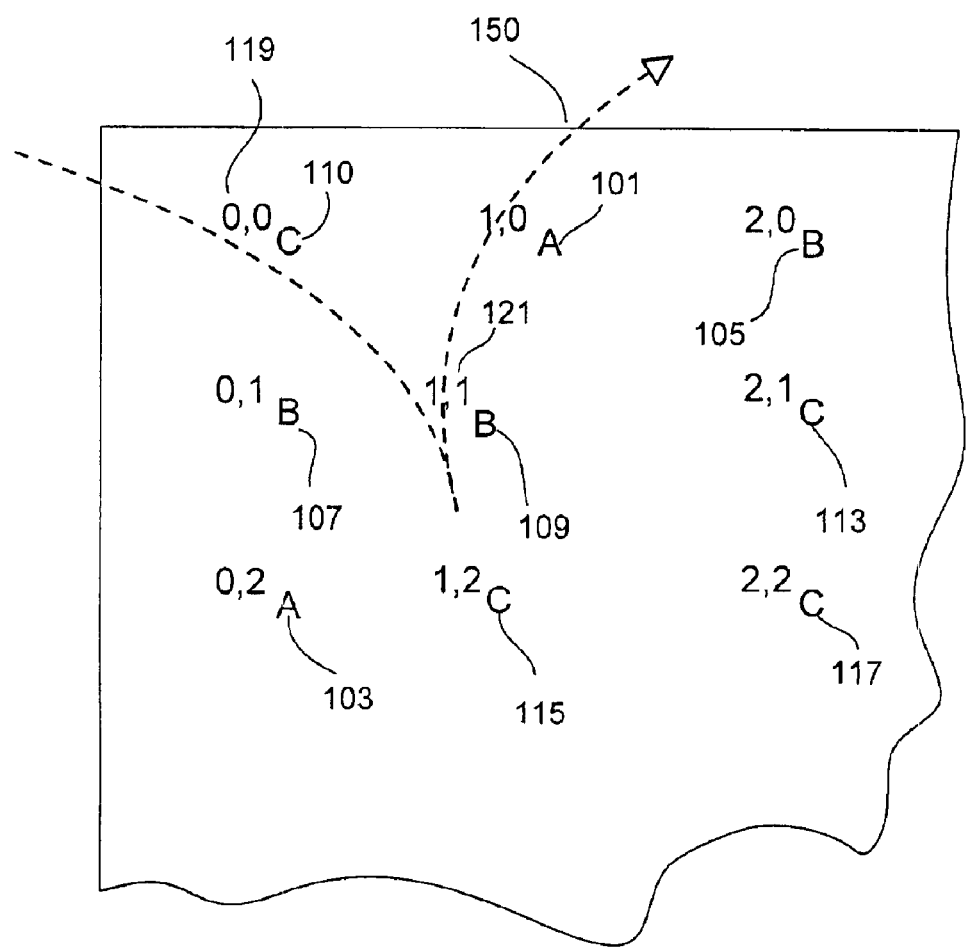
FIG. 1 is a representation of a printed page encoded with an address according to an embodiment of the present invention.

Referring now to the drawings, and in particular to FIG. 1, there is shown a page with a representation of an encoded message. In this exemplary embodiment, the message corresponding to the printed document is "ABC." Fragments of the message, e.g., "A", "B" and "C" are encoded at different pseudo-random locations on the page. For instance, the "A" portion of the message is encoded at points 101 and 103. The "B" portion of the message is located at points 105, 107 and 109. The "C" portion of the message is located at points 110, 113, 115 and 117. Absolute location information is also encoded on the printed page. Referring again to FIG. 1, the upper left corner region is encoded with a "0,0" at 119; a center region is encoded with a "1,1" at 121; etc.

In the exemplary embodiment, the fixed mapping between absolute locations and message fragments appears in Table 1.

TABLE 1

Mapping between Absolute Locations and Message Fragments

| Absolute Location | Fragment Position |
|---|---|
| 0, 0 | 3 |
| 1, 0 | 1 |
| 2, 0 | 2 |
| 0, 1 | 2 |
| 1, 1 | 2 |
| 2, 1 | 3 |
| 0, 2 | 1 |
| 1, 2 | 3 |
| 2, 2 | 3 |

In one embodiment, the printed page is scanned by a mobile, possibly handheld, device which reads a swath of the printed page. Referring again to FIG. 1, a swath is shown 150 by a dashed line. In this exemplary embodiment, a camera or scanner is moved across the page in the path indicated by the dashed lines 150. For this movement, the message fragments and absolute locations read would be (0,0), (1,1) and then (1,0). While the fragments are read in the order of CBA, they are decoded as ABC because each fragment is mapped to an absolute location and the device reads the absolute location and decodes it using a table such as TABLE 1, above.

When the page is scanned in its entirety, the scanning device will have all of the message information at its disposal. If a portion of the page is missing or damaged, the message is still often retrievable due to the repetition of message fragments A, B and C 101, 103, 105, 107, 109, 110,

113, 115 and 117 across the page. It will be apparent to one skilled in the art that various schemes can be used to determine how frequently and at what resolution the message fragments appear on the printed page. There are obvious trade-offs regarding printer and scanner resolution, visibility to a human eye, range of motion for a handheld device to retrieve an entire message, etc. One skilled in the art will determine the requirements necessary for the desired application and adjust the trade-offs accordingly.

In the exemplary embodiment, the handheld device contains an imaging device capable of both reading the encoded information and of determining the relative motion of the handheld device. One way to implement this is by using a small digital camera and lens such that the camera is focused on a small spot on the surface on which the device rests. The camera may detect the encoded information by using standard computer vision techniques to recognize the printed dots in the image, and extract the information from their measured locations. The camera may also detect the relative motion of the device by taking images of whatever surface the scanner happens to be on, and then using standard computer vision techniques, analyzing the changes in the images over time to determine relative translation and rotation in the plane of the surface (this is the similar to the way current optical mice operate).

As the device slides across a printed page, it can calibrate its measured motion by comparing the measured relative motion to the observed printed absolute locations. Then it can use those calibration parameters, along with its measured motion, to compute a relative location. For example, say the device notices that every 10 cm of horizontal motion corresponds to 5 units of printed absolute location, then if you moved 30 cm to the right, it would compute a relative motion of 15 units to the right of where it started. Notice that so long as the device starts on the paper (to get an initial absolute location, and calibrate itself), it may continue to provide relevant information well beyond the limits of the printed page. The imaging device, and the computation to analyze the images, may reside in separate modules, or they may be implemented in a single self-contained module. The implementation of such systems will be apparent to one skilled in the state of the art.

In the exemplary embodiment, the handheld device contains a display. That display may be implemented with existing Liquid Crystal Display (LCD) technology. This technology permits the display to be either transparent (in which case the displayed information may appear to overlay whatever surface is beneath the display) or opaque (in which case it looks like a standard computer notebook display). Those familiar with the state of the art should recognize that there are a number of alternative display technologies suitable for such use, and the choice will depend on a number of design trade-offs. It should also be apparent that there are alternative methods of providing information for the user. For example, the device may contain a printer. In one embodiment the printer is a standard office printer, physically separate from the handheld device. In another embodiment, the printer is a separate module located within the handheld device. In an alternative embodiment, the printer is capable of printing directly on the surface beneath the handheld device, so that it prints information onto the same page from which it is obtaining encoded positional information. In that case the device may rely entirely on motions of the user's hand, and need have no moving parts (aside from the ink droplets). The device could also contain an audio or video playback module.

In the exemplary embodiment, the handheld device contains a user interface. This may be implemented with push-buttons, dials or sliders. There are trade-offs in deciding how many controls, and of which types, should be included. Those familiar with the state of the art will be able to make such choices based on the particular applications intended for the device.

In the exemplary embodiment, the handheld device also includes a computer. This computer recognizes messages detected by the scanner and performs pre-coded actions which depend on the encoded message, the sensed location information (both absolute and relative), the state of the user interface (is the user pressing any button) and its previously-stored state. For example, the combination of this handheld device and a specially printed page may be used to plan a road trip. In this case, the printed page appears as a map to the human user, but contains both a message and encoded location information. As the user slides the PDA across the map, the encoded message is extracted, and the computer recognizes that it refers to a particular map. Then it may combine the absolute and relative location information to extract from an internal database a list of cities/sights related to the region of the printed page beneath the device. These may then be displayed for the user. To plan the trip, the user moves the device over sights of interest and presses a "select" button when each is in the display. Each time this is done, the computer remembers the currently-displayed city/sight information and its location. In this way, the combination of the printed page and the handheld device is used to quickly enter large amounts of information in a very natural way. When done, the user slides to a region of the map on which is printed "plan my route." The computer recognizes the combination of the message and this absolute location, so it plans a route through all the remembered locations. Now, it may display the route for the user. Each time the device is moved, it determines the new location, and draws the portion of the route corresponding to the portion of the map under the device. If the user wishes, they can now view the route by sliding back over the map—on the screen they see the map below, with their route overlaid on top. The user may then continue to manipulate the on-screen map, merely by sliding the hand-held device on any convenient flat surface. In that case the computer notices that no absolute position is available, and uses the relative location information and the last known absolute position. The user also has the option to zoom in or out, changing the scale of the computer-generated display and also the relation between motion of the device and motion of items in the display. It should be apparent to one skilled in the art that this relation may be computed such that it appears to the user as though the display were a window over a virtual document, and where the computer zoom control has the effect of enlarging or shrinking that virtual document.

In one embodiment, security or authorization information is contained within the message. When a document with security information encoded within the message is scanned, a user may be required to enter a password, or the identity of the user may be assumed depending on the access device being used. For instance, the user may have already logged on and identified oneself.

In an alternative embodiment, additional information may be encoded in the message for marketing purposes. For instance, when sending each customer a document, a company embeds the customer's ID number within each printed copy. Then, when a device with access to the Internet is used on one of those documents, it (with the user's permission) notifies the company that a particular customer's printed copy is being accessed by a particular device. This, for example, enables a company to track how many different people use each particular printed copy.

In another embodiment, the message comprises an embedded sequence of processing instructions, or macro. The macro uses one or both of the absolute and relative location information as arguments. Once the macro is scanned and extracted, the processing instructions are interpreted, or executed, by the computing device. In an alternative embodiment using macros, the macro holds instructions to retrieve or modify data in at least one storage device and uses that obtained information in its execution. For example, the system may store the state of the user interface, or it may retrieve information for display from a database on a storage device.

Figure 2:
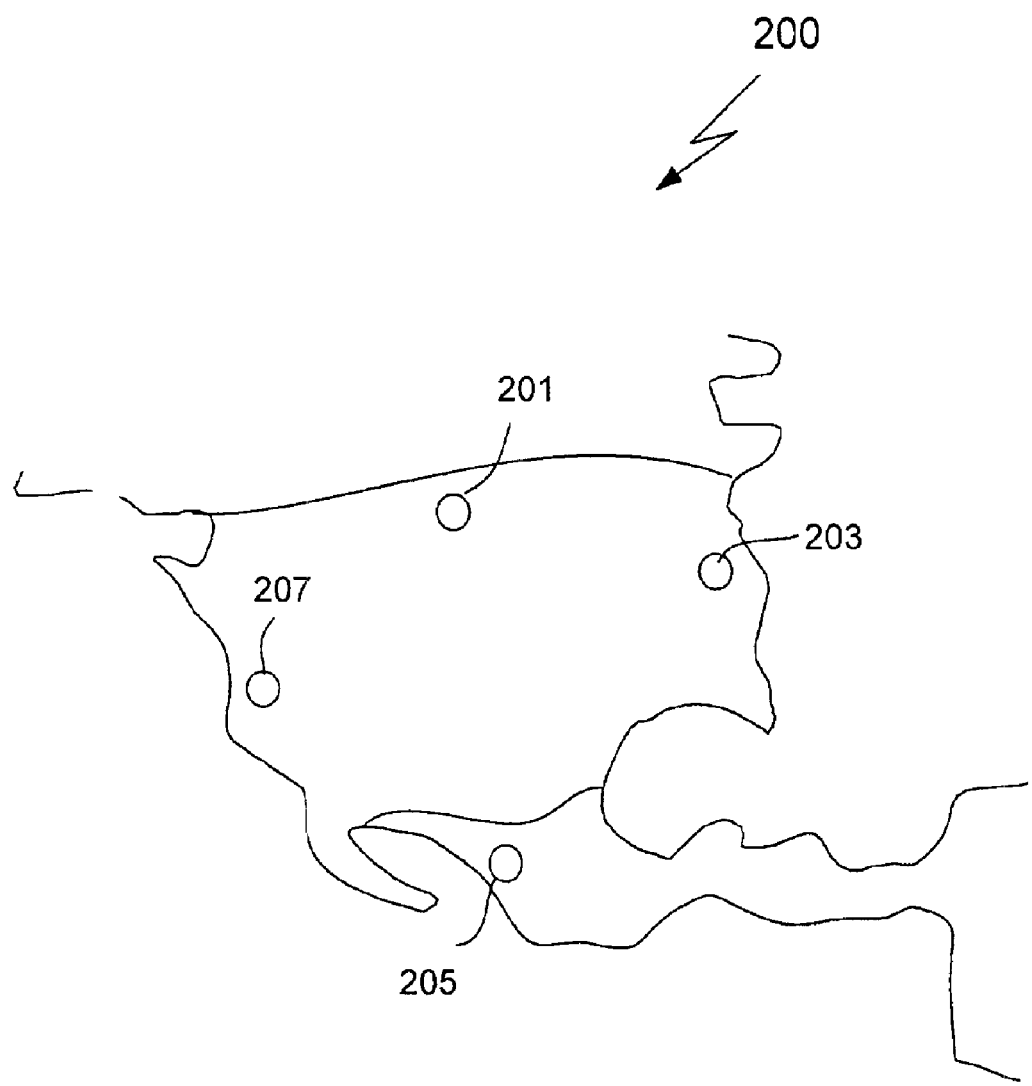
FIG. 2 is an illustration of a printed sales by region map as might be used in an application of an embodiment of the present invention.
Figure 3:
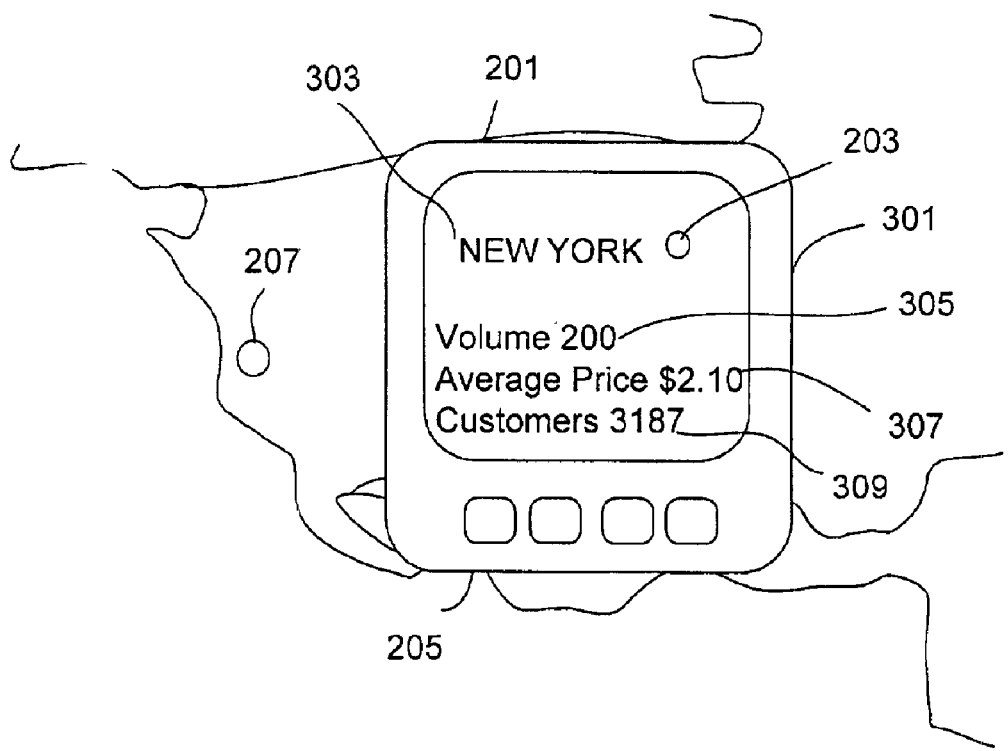
FIG. 3 is an illustration of an application of an embodiment of the present invention where a personal digital assistant acts as a magnifying glass for a printed sales region map document.

In another embodiment, a device is used to retrieve or display more detailed information related to an absolute location on the printed page. Referring now to FIG. 2, a sales region 200 for a particular market is represented. Four distribution centers, or sales offices are shown 201, 203, 205 And 207. Suppose a salesperson has this printed page, but not a printed version of the entire inventory list of each center while on a sales call. If additional information is needed, it can be produced in the field using an embodiment of the present invention. The salesperson has a specialized PDA with a camera or scanning device located typically on the underside. It will be apparent to one skilled in the art that the location of the camera or scanning device will depend on the ergo-dynamics of the handheld device. FIG. 3 shows a specialized PDA 301 on top of the printed page with the sales region 200.

Referring now to FIG. 3, the PDA 301 is placed over sales office 203, which happens to represent New York City, N.Y. The PDA will then display information related to the region, such as the name of the sales office 303, a volume of business 305, an average price, and a quantity of customers 307. It will be apparent to one skilled in the art that the displayed information is dependent on the desired application and is defined by an application programmer. In some embodiments, an action by the user may be required, such as a mouse or button click/press, before displaying the related information. This action will avoid visual confusion as the display updates with varying related data continuously as the PDA or other device is moved across the printed page.

Figure 4:
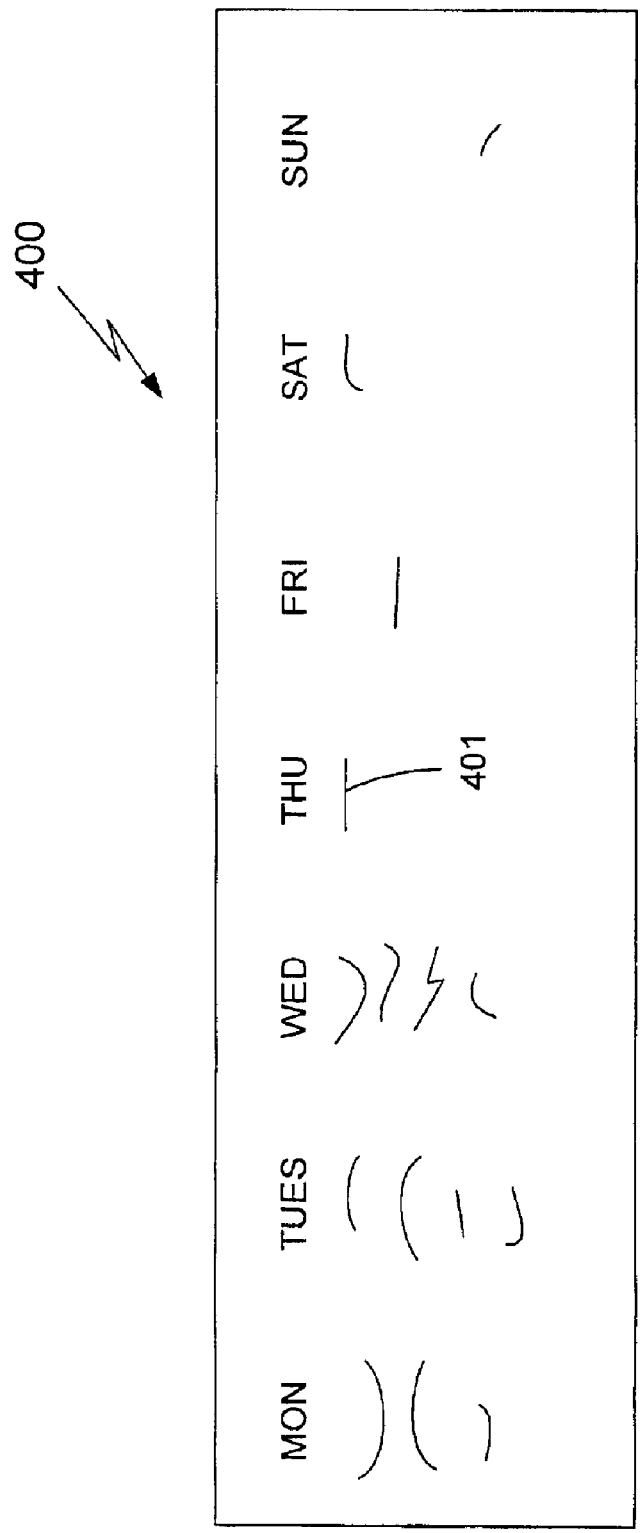
FIG. 4 is an illustration of a calendar page as might be used in an application of an embodiment of the present invention.
Figure 5:
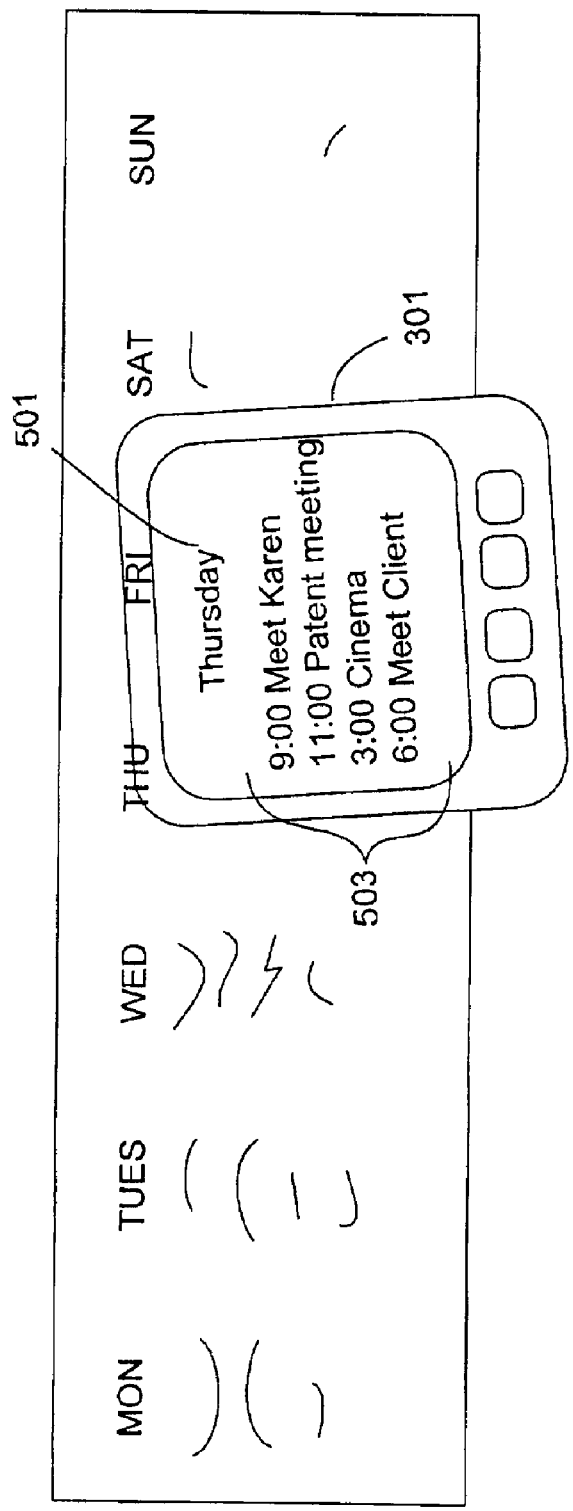
FIG. 5 is an illustration of an application of an embodiment of the present invention where a personal digital assistant acts as a magnifying glass for a printed calendar document.

In another embodiment, the system is used to access updated calendar information, rather than related information. Referring now to FIG. 4, there is shown a representation of a calendar 400 for a selected week. The calendar has items stored for each day of the week. The calendar is accurate at the time of printing, but may be updated a number of times without reprinting. In some cases, the owner of the calendar will update the items, but have no access to a printer, for instance while on business travel. Referring now to FIG. 5, the PDA 301 is placed over a day of the week, e.g., Thursday 501. While the printed version of Thursday's events 400 shows only one item 401, the version displayed on the PDA 301 is updated to show four (4) items 503. Furthermore, if the device is now slid down off the printed calendar it will display the following week, if slid further, it will display the week after that, and so on. The user may now dispense with the printed page entirely, zooming in and out using controls, and sliding up/down left/right to move through different calendar entries, days, weeks, months, and years. It will be apparent to one skilled in the art that the entire user's calendar may be accessed in this way and that the same techniques are applicable to a range of other domains.

In another embodiment, there is a system where every salesperson has a specialized PDA with a memory card in it. The memory card holds the company confidential information about the cost of each product and current availability and other relevant data. The device has all of the information built into it and the salesperson just carries it around with them. An advantage of this embodiment of the present invention is that the salesperson gains access to information inside the device in a way that's very natural. For example, the salesperson has a printed catalog with a picture of every different product that they sell and they flip open to the page where the particular product is that their customer is interested. Then the salesperson just runs across that page with their PDA and up on the screen of the PDA pops the most up-to-date information, how or if any of those products are available and what the current price is and what the backlog is, etc. The printed page serves as an interface for relatively static information and the PDA serves as your interface for the more dynamic portion of the information.

In this scenario, a printed page might have one corner in which is printed a blank box that said "availability" but doesn't have any number in it. In the other corner a blank box is printed that says "costs." When a user slides over the cost box with the PDA it shows the cost. When a user slides over the availability box, the PDA display shows the current availability. In one embodiment, this information is maintained locally, within the PDA. An advantage of this embodiment is that no communication is necessary to other servers or systems in a network. The salesperson has another printed page, containing a grid. From left to right are the different industry sectors. Under each sector heading is a copy of the alphabet, from A at the top, to Z at the bottom. To access information on a particular customer, the salesperson simply slides their PDA across the page to the sector they're interested in, and then slides up and down to scroll through all their customers. They can get to any particular customer quickly by sliding straight to the appropriate letter of the alphabet. In this way, the salesperson is able to navigate both the product database, and the customer database, using a single device, and without any user action other than sliding the device on a printed page. Furthermore, since the message encoded on the page is encoded redundantly, the salesperson need not carry the whole of each printed page with them. Once familiar with the customer lists and the product catalogue, they could print a single page, with a small portion of the customer list, and a small portion of the catalogue. Now, to access one or the other, they slide over that small portion, then raise the device, place it on a table, and then continue to slide. On the screen, the result is exactly the same as when they had the whole printed page beneath the device.

The user (salesperson) has all the relevant data local to the printed page. In other embodiments, the data is retrievable over a network, by wired or wireless methods. Other embodiments may store some data locally, and some remotely.

Figure 6:
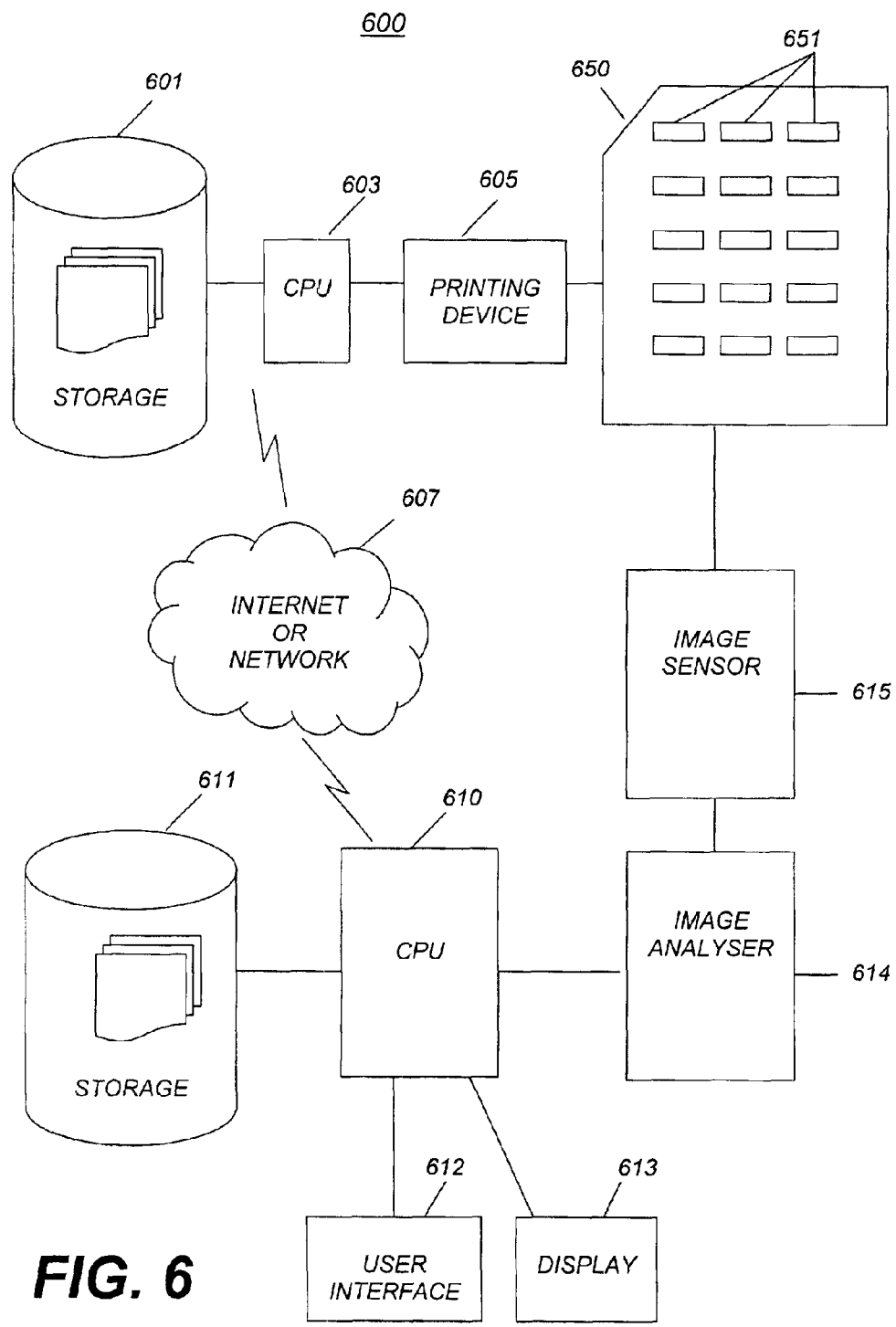
FIG. 6 is a block diagram showing a system according to an embodiment of the invention.

A system 600 utilizing an embodiment of the present invention is shown in FIG. 6. A storage or memory 601 holds a plurality of documents and/or related data. The storage is connected to a printing device 605, typically through a CPU or other computing device 603. In some embodiments, the printing device has an imbedded processor and accesses the storage 601 directly. The printing device is capable of printing documents from the storage encoded with message and absolute location information 651 on a page 650. It will be apparent to one skilled in the art that the specifications of this printing device are dependent on the method selected for encoding the information. For instance, if it is desired that the address be invisible to the naked eye, the printing device 605 might use a special ink. Various resolutions may be implemented based on trade-offs, as discussed above.

In one embodiment, a handheld device comprises a CPU 610, storage 611, user interface 612, display 613, an image sensor 613, and an image analyzer 614. The image sensor takes images of the surface on which the device is located. The image analyzer, analyzes those images to extract a message and absolute location (when the handheld device is over a printed document 650) and relative motion (regardless of the surface on which the device is located). When a message is recognized by the image analyzer, it alerts the CPU 610, which looks up the message in its storage 611, and performs the appropriate pre-programmed action(s). The user may alter those actions using the user interface 612, and may observe the results or side effects by viewing the display 613.

In some embodiments, the storage 611 may be supplemented or replaced by remote storage 601 via a remote connection 607. The connection to remote storage 601 can be via a local area network (LAN), wide area network (WAN), global distributed network, intranet, extranet or wireless network.

In some embodiments the various components may not all be physically connected, but may reside in separate containers connected via wired or wireless means using dedicated or shared connections. For example the image sensor could be located in a pen, while the image analyzer, CPU and display were located in a PDA.

Figure 7:
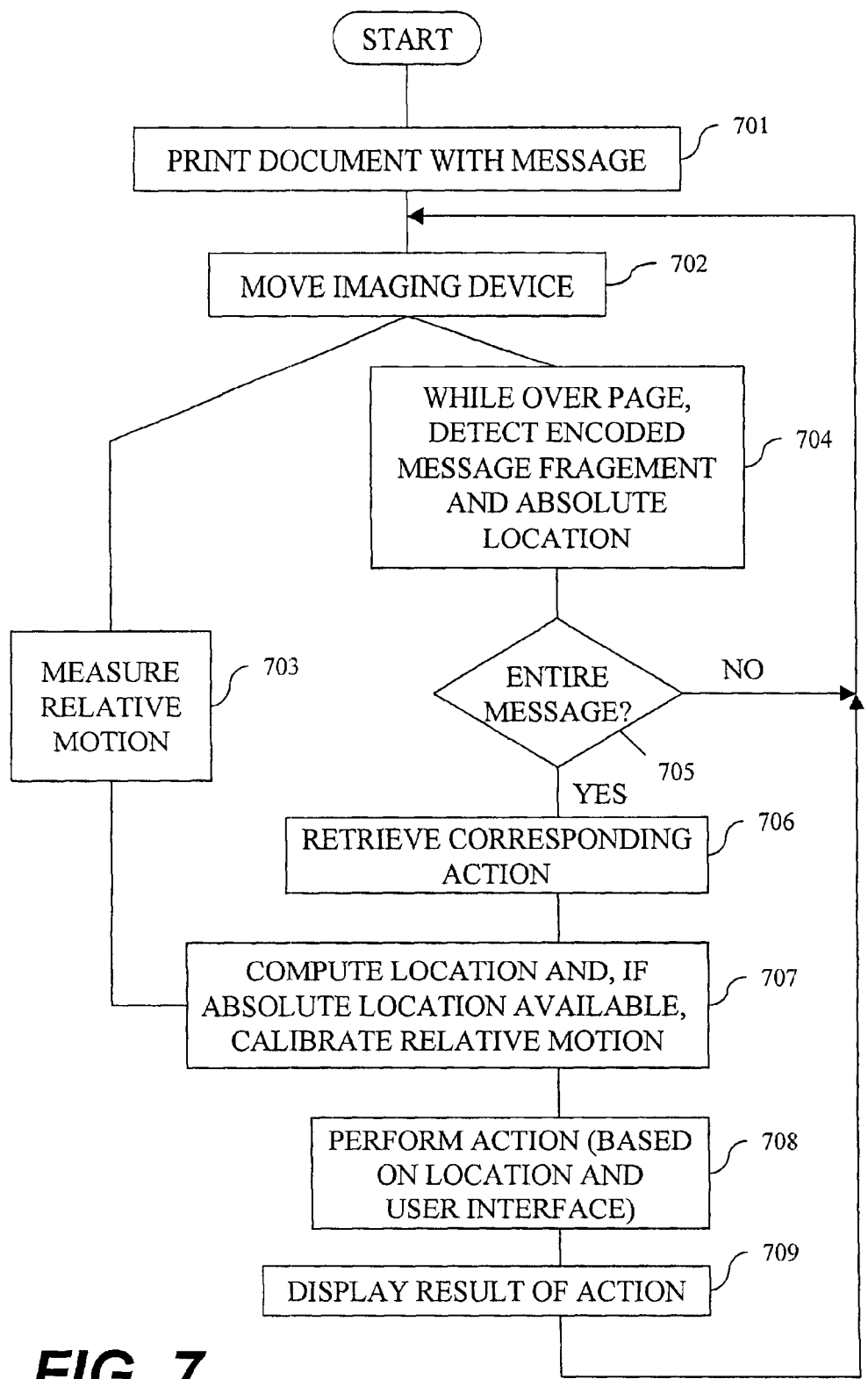
FIG. 7 is a flow diagram showing the method of an embodiment of the present invention.

FIG. 7 shows a flow diagram which describes a method for using an embodiment of the present invention. A document is printed in block 701 using a special printer, where the document is encoded with message and location information, as discussed above. This document will typically have useful data imprinted on it in addition to the message and location information. If a user desires to interact with the printed document, then they slide the imaging device across it, in block 702. As the device moves, it continuously computes relative motion in block 703.

While the device is over the printed page, the image analysis system detects the presence of the encoding and extracts a fragment of the message, and an absolute location from the image in block 704.

As the device moves across the page, more and more of the message is collected, until the entire message has been accumulated. A determination is made as to whether the entire message has been collected in block 705. If the entire message has been collected, the system retrieves the pre-coded action corresponding to that particular message in block 706.

In cases where the device is able to extract the absolute location information in block 704, it uses that knowledge, in block 707 to calibrate the measured relative motion. The last-known absolute location is used with the measured relative motion to compute a new location. The pre-coded action is then executed based on the location computed, in block 708.

Finally, the results of the pre-coded action are displayed for the user in block 709. The user may then continue to move the device, and the display will continuously update.

Executing the pre-coded action may require the device to retrieve related data from a local or remote location based on the message and application. If the message is defined with security or authorization levels, the user is authenticated prior to the display or output of any data. It will be apparent to one skilled in the art that any of a variety of authentication methods, now known or to be invented, may be used to enable this functionality.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for using a printed document encoded with a message, comprising:

a movable image sensor that collects images of portions of the printed document, each portion being encoded with (1) an absolute location within the printed document and (2) a fragment of the message, wherein a known mapping exists between the position of each fragment and the corresponding absolute location; and an image analyzer coupled to the image sensor to determine relative motion of the image sensor and extract absolute locations and fragments of the message from the images, wherein the image analyzer extracts the message from the fragments using the known mapping.

2. The system as recited in claim 1, wherein the message is of variable size.

3. The system as recited in claim 1, wherein the image analyzer determines the relative motion of the image sensor by measuring changes in successive images such that the relative motion can still be extracted even when the image sensor is not over the printed document.

4. The system as recited in claim 1, wherein the printed document is selected from a group comprising a map, a calendar page, a catalog, a customer list, and an index.

5. The system as recited in claim 1, further comprising a computing module that performs a predefined action in response to the extracted message and at least one of (1) the relative motion of the image sensor and (2) the absolute locations within the printed document.

6. The system as recited in claim 5, wherein the predefined action is selected from at least one of the following:

retrieving information from an information store;

changing the internal state of the computing module;

storing information in an information store; and retrieving and executing a macro, wherein the macro comprises a sequence of processing instructions which uses at least one of the absolute locations, the relative location, and the internal state of the computing device.

7. The system as recited in claim 5, wherein the encoded message further comprises security information, and wherein the predefined action is authenticated using the security information before being performed.

8. The system as recited in claim 5, further comprising at least one output device for showing results or side-effects of performing the predefined action, wherein each of the at least one output device is one of a type selected from the group consisting of a printer, visual display, audio device, audio-visual device, and multi-media device.

9. The system as recited in claim 8, wherein at least one output device is a visual display, and the image sensor and visual display are integrated as one physical unit, thereby allowing the display to appear as a window over the printed document.

10. The system as recited in claim 9, wherein each pixel on the visual display is either transparent or opaque, and computer-controlled.

11. The system as recited in claim 8, wherein at least one output device is a print-head, and the image sensor and print-head are integrated as one physical unit, thereby allowing the print-head to leave marks, under computer control, on a surface being scanned by the image sensor.

12. The system as recited in claim 5, wherein a zoom factor is used to modify the relative motion of the image sensor.

13. The system as recited in claim 5, further comprising a user interface in communication with the computing module, wherein the user interface is used to select or modify the predefined action to be performed in response to the extracted message and at least one of (1) the relative motion of the image sensor and (2) the absolute locations within the printed document.

14. The system as recited in claim 5, wherein the predefined action depends on at least one of an identity of the image sensor, an identity of the computing module, and an identity of a human holding the image sensor.

15. A system for using a printed document encoded with a message, comprising:
  a movable image sensor that collects images of portions of the printed document, each portion being encoded with (1) an absolute location within the printed document and (2) a fragment of the message, wherein a known mapping exists between the position of each fragment and the corresponding absolute location;
  an image analyzer coupled to the image sensor to determine relative motion of the image sensor and extract absolute locations and fragments of the message from the images; and
  a computing module that extracts the message from the fragments using the known mapping and performs a predefined action in response to the message and at least one of (1) the relative motion of the image sensor and (2) the absolute locations within the printed document.

16. The system as recited in claim 15, wherein the message is of variable size.

17. The system as recited in claim 15, wherein the printed document is selected from a group comprising a map, a calendar page, a catalog, a customer list, and an index.

18. The system as recited in claim 15, wherein the predefined action is selected from at least one of the following:
  retrieving information from an information store;
  changing the internal state of the computing module;
  storing information in an information store; and
  retrieving and executing a macro, wherein the macro comprises a sequence of processing instructions which uses at least one of the absolute locations, the relative location, and the internal state of the computing device.

19. The system as recited in claim 15, wherein the image analyzer determines the relative motion of the image sensor by measuring changes in successive images such that the relative motion can still be extracted even when the image sensor is not over the printed document.

20. The system as recited in claim 15, wherein the encoded message further comprises security information, and wherein the predefined action is authenticated using the security information before being performed.

21. The system as recited in claim 15, further comprising at least one output device for showing results or side-effects of performing the predefined action, wherein each of the at least one output device is one of a type selected from the group consisting of a printer, visual display, audio device, audio-visual device, and multi-media device.

22. The system as described in claim 21, wherein at least one output device is a visual display, and the image sensor and visual display are integrated as one physical unit, thereby allowing the display to appear as a window over the printed document.

23. The system as described in claim 22, wherein each pixel on the visual display is either transparent or opaque, and computer-controlled.

24. The system as recited in claim 21, wherein at least one output device is a print-head, and the image sensor and print-head are integrated as one physical unit, thereby allowing the print-head to leave marks, under computer control, on a surface being scanned by the image sensor.

25. The system as recited in claim 15 wherein a zoom factor is used to modify the relative motion of the image sensor.

26. A method for using a printed document encoded with a message, comprising:
  collecting images of portions of the printed document by an image sensor, each portion being encoded with (1) an absolute location within the printed document and (2) a fragment of the message, wherein a known mapping exists between the position of each fragment and the corresponding absolute location;
  determining relative motion of the image sensor;
  extracting absolute locations and fragments of the message from the images;
  reconstructing the message from the fragments using the known mapping; and
  performing a predefined action in response to the message and at least one of (1) the relative motion of the image sensor and (2) the absolute locations within the printed document.

27. The method as recited in claim 26, wherein the message is of variable size.

28. The method as recited in claim 26, wherein the predefined action is selected from at least one of the following:
  retrieving information from an information store;
  changing the internal state of the computing module;
  storing information in an information store; and
  retrieving and executing a macro, wherein the macro comprises a sequence of processing instructions which uses at least one of the absolute locations, the relative location, and the internal state of the computing device.

29. The method as recited in claim 28, wherein changes to the internal state of the computing module are indicated by entering input using a user interface, the user interface being in communication with the movable device, the changes to the internal state thereby influencing performance of subsequent actions.

30. The method as recited in claim 28, further comprising:
  extracting an identifier from the encoded message; and
  recording the identifier and corresponding usage information in the information store, wherein the corresponding usage information comprise at least one of a device identifier for the image sensor, an identifier for a user of the image sensor, a description of the predefined action to be performed, and a time at which the predefined action is performed.

31. The method as recited in claim 30, wherein information extracted from the information store is further based on the extracted identifier.

32. The method as recited in claim 26, wherein determining relative motion of the image sensor further comprises measuring changes in successive images such that relative motion can still be extracted even when the image sensor is not over the printed document.

33. The method as recited in claim 26, wherein the encoded message further comprises security information, and wherein the step of performing the predefined action is preceded by a step of authenticating the predefined action using the security information.

34. The method as recited in claim 26, further comprising showing results or side-effects of performing the predefined action on at least one output device, wherein each of the at least one output device is one of a type selected from the group consisting of a printer, visual display, audio device, audio-visual device, and multi-media device.

35. A method for monitoring the use of printed documents, said method comprising steps of:

encoding a customer identification mark on a printed document, the printed document being further encoded with fragments of a message distributed across a plurality of locations on the printed document, the fragments being correlated with an encoded absolute location within the printed document; and determining identification of the image sensor from which a request for information is originated, the information request being determined by a scanning of a portion of the printed document by an image sensor, the image sensor determining a relative location on the portion of the printed document corresponding to relative motion of the image sensor, and the requested information being related to the scanned portion of the printed document.

36. The method as recited in claim 35, further comprising the step of correlating the identification of the image sensor with a corresponding user.

37. The method as recited in claim 36, further comprising assembling the requested related information based on the corresponding user.

38. The method as recited in claim 37, further comprising sending the corresponding user the requested related information.

* * * * *